Patented Sept. 14, 1954

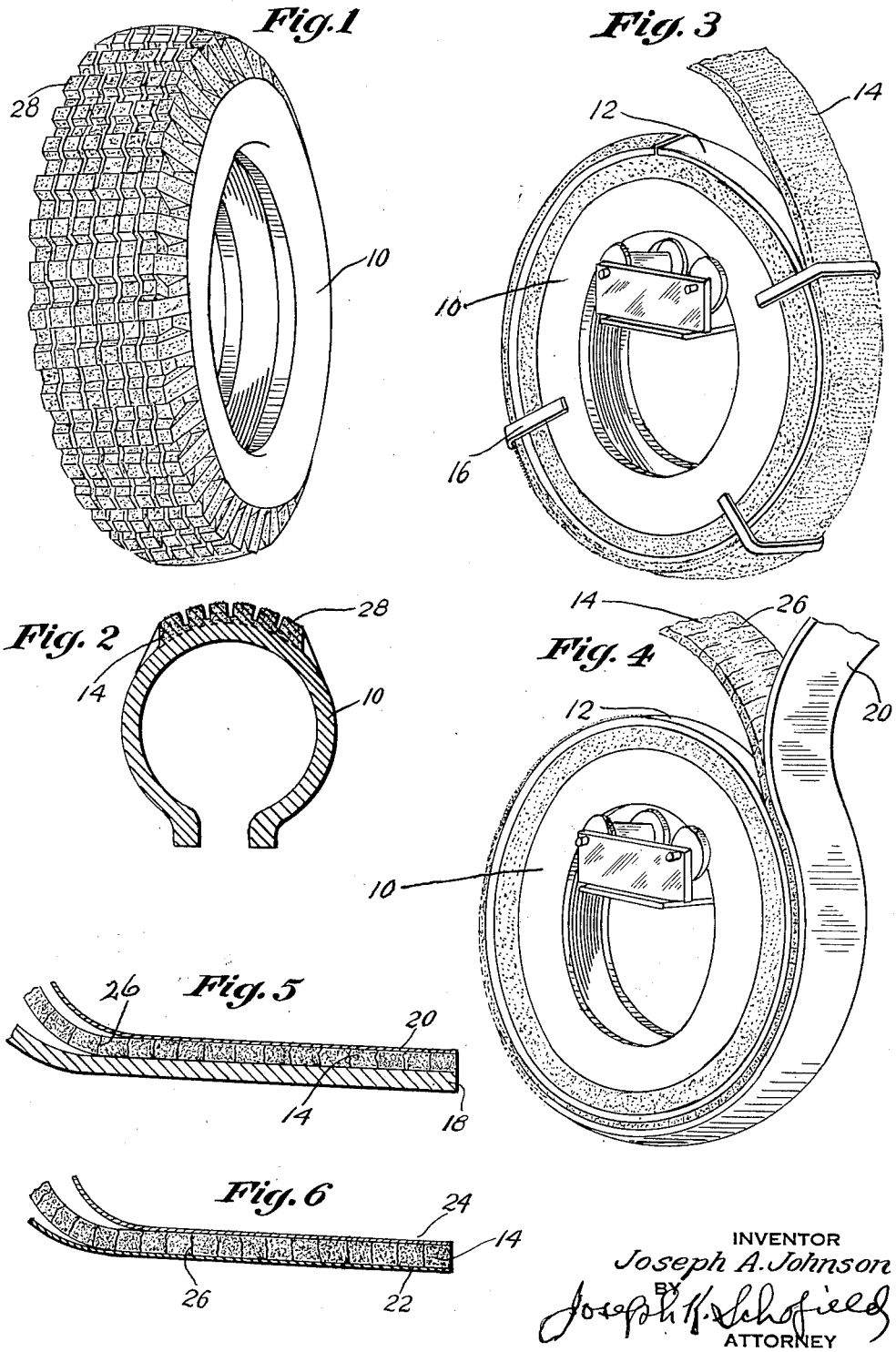

2,689,200

UNITED STATES PATENT OFFICE 2,689,200

RECAPPING MEMBER FOR AUTOMOBILE TIRES

Joseph A. Johnson, Windsor, Conn.

Application September 28, 1950, Serial No. 187,270

2 Claims. (Cl. 154—46)

1

This invention relates to automotive vehicle tires and more particularly to means for providing an inflatable tire with non-skidding surfaces on its tread.

A primary object of the invention is to provide a tire for use on automotive vehicles that will have embedded in its outer or road contacting surface elongated finely shredded metallic material such as steel wool, preferably of the stainless type or other non-corrosive and non-rusting metal, which are abrasive, extremely light weight and are bonded or vulcanized to the rubber of the tread surface of the tire during the initial production of the complete tire or during a retreading operation.

Another object of importance of the invention is that a strip of steel wool or other metal having fine elongated and closely intermeshing shreds of steel or other metal is molded into the tire tread so that most of the shredded metal is closely adjacent the outer or road engaging surface so that the shreds of steel or other metal will contact with and give a non-skidding surface, or a large number of small separated surfaces, on the tread of the tire.

And finally it is an object of the invention to provide a retreading member or material comprising a layer of semi-vulcanized rubber to which a layer of steel wool or other metallic shredded material is adhesively attached on one side so that the rubber may be applied to a worn tire and form after completing the curing operation a new tread surface for the tire.

A feature of importance of the invention is that the steel wool or other shredded metal may be covered on both sides so that a complete and easily handled article may be applied to a worn tire during a re-capping operation.

With the above and other objects in view the invention may include the features of construction and operation set forth in the following specification and illustrated in the accompanying drawing.

In the accompanying drawing annexed hereto and forming a part of this specification, I have shown the invention embodied in a retreaded tire and also show several forms of material for effecting the retreading operation; but it will be understood that the invention can be otherwise embodied and that the drawing is not to be construed as defining or limiting the scope of the invention, the claims appended to this specification being relied upon for that purpose.

In the drawing:

Fig. 1 is a perspective view of a complete tire

2 provided with a characteristic form of tread made according to and embodying the present invention;

Fig. 2 is a cross sectional view of the tire shown in Fig. 1;

Fig. 3 is a perspective view of a tire in the process of assembling its parts preparatory to its being vulcanized;

Fig. 4 is a view similar to Fig. 3 showing a modified form of the tread forming or re-capping material;

Fig. 5 is a detached view in side elevation of one form of the tread forming or re-capping material, and Fig. 6 is a view similar to Fig. 5 showing a modified form of the tread forming or re-capping material.

In the above mentioned drawing, there have been shown several embodiments of the invention which are now deemed preferable but it is to be understood that changes and modifications may be made within the scope of the appended claims without departing from the spirit of the invention.

Briefly and in its broadest aspect, the invention comprises a tire to the tread surface of which has been embodied during manufacture, or during a retreading operation a mass of intermingled shredded metal such as steel wool or other non-corrosive, non-rusting abrasive metal, these strips or shreds of steel wool or other material of an abrasive non-corrosive type being moulded into the tire with the rubber tread material.

This application is a continuation in part of my co-pending application Ser. No. 76,259 filed February 14, 1949, now Patent No. 2,542,871, granted February 20, 1951.

Referring more in detail to the figures of the drawing and first to Fig. 3 there is shown a complete tire body or shoe 10 which may be an automotive tire the tread of which has become worn. Preferably the tire body or shoe 10 is first abraded to remove the remains of the worn tread and leaving a rough but clean rubber surface for the retreading operation. Over this tire shoe 10 thus prepared is wrapped a strip of partially vulcanized rubber 12, this strip 12 being attached to the shoe or body portion 10 throughout its surface preferably by means of rubber cement so that the strip 12 or "camelback" will be adhesively retained properly and securely in place preparatory to being placed in a mold.

Surrounding this strip of partially vulcanized rubber 12 is loosely wrapped a length or strip of shredded steel 14. This material is familiarly known as steel wool and is prepared in the form of loosely intermeshing fine shreds of steel, preferably of the stainless steel type, the width of this strip 14 being sufficient to cover the width of the tread portion of the tire 10. In place of steel wool, shredded brass, Monel metal or other metal alloy may be substituted.

This strip of steel wool or other metal or alloy 14 may be strapped to the tire surrounding the camel-back by widely spaced transversely extended bands 16 the ends of which may be cemented to the side walls of the tire 10.

Preferably a thick strip of camel-back 12 may have its strip of shredded metal 14 secured to it continuously throughout its length prior to placing about a tire. This attachment of the rubber 12 to the metal 14 may be effected by rolling the two strips together under pressure so that some of the metal shreds may be embedded in the rubber. The combined strip of rubber and shredded metal as shown in Figs. 5 and 6 may then be applied directly and in a single operation to the tread surface of a tire. Also if desired both sides of the metal strip 14 may be covered by strips of rubber 18 and 20, the inner one 18 being of full thickness for the retreading and the outer one 20 thin and only of sufficient thickness to be attached to the metal strip by being compressed by rolling thereon and to cover the surface of the metal strip. Alternatively both sides of the metal strip 14 may be covered by thin strips of rubber 22 and 24. In this latter case a camel-back 12 of conventional form would first be applied to the tire body 10 and then the metal strip 14 covered by thin sheets 22 and 24 on opposite sides applied to the outer surface of the camel-back 12.

To facilitate the retreading operation and to permit the maximum amount of the shredded metal being retained on the tread surface of the tire the metal strip 14 may be cut as indicated at 26 in Fig. 4 prior to being attached to the rubber strip 18 or 22 on one or both surfaces. As shown in Fig. 4 the cuts 26 extend only partially across the width of the strip 14 and extend alternately from opposite sides.

The tire 10 with the layer of rubber 12 forming the retreading material with the strip of shredded metal 14 in place thereon is then placed in a mold having the desired tread surface cut into annular matrix sections. The matrix sections are mounted in place within the ring members of the vulcanizing or curing machine. An inflatable bag is then placed within the tire in the usual manner and with the mold rings closed and with an expansible steel rim of usual form inserted, air under pressure is applied to the space within the bag. Heat is then applied to the hollow mold rings so that the semi-vulcanized material forming the camel-back 12 is softened and melted sufficiently to permit the material forming the camel-back to flow into the tread recesses in the mold matrices. With the material of the camel-back 12 the shreds of the metal strip 14 are also carried into the tread forming pockets of the matrices. Heat and pressure are continued long enough to complete the vulcanization of the new tread material formed by the camel-back 12 during which the steel wool 14 or other shredded material is forced with the soft rubber into the outer portions of the tread forming recesses of the matrices. On completion of the vulcanization the pressure within the inflated bag is released and the mold rings and steel rim opened after which the tire 10 with its newly molded tread material may be removed. The steel shreds of the steel wool 14 or other shredded abrasive metal will be, as indicated in Figs. 2 and 3, concentrated adjacent the outer or road contacting surface 28 of the tire 10 and will not in any way interfere with the vulcanizing of the camel-back material 12 to the tire shoe 10.

Any desired tread surface or surfaces may be formed on the tire 10, those shown in Fig. 1 being a preferred or standard form having small rectangular projections each separated from the others so that small gripping areas individually separated from the others are provided uniformly distributed over the tread surface of the tire. In the outer or road contacting portions of these projections will be concentrated the shredded metal particles to form the anti-skidding and gripping elements of the tread.

The shredded steel 14 is extremely light and adds but slightly to the total weight of the tire. It is uniformly distributed over the road gripping surface circumferentially and transversely of the tire. As the steel shreds 14 are applied to the tire body 10 over the tread forming material 12 the shreds of steel or outer abrasive metal are concentrated at the periphery of the tire tread surface. By means of the cuts 26 into the strip 14 of shredded metal the strip readily may conform itself to different forms of tread forming matrices and permit the shreds to freely enter the pockets of the matrices. By this means the maximum amount of shredded metal may be concentrated on the road contacting portions of the tire tread.

I claim as my invention:

1. A recapping member for automotive tires comprising a heavy strip of semi-vulcanized rubber forming a camel-back, a strip of loosely intermeshed shreds of non-corrosive metal attached to one side thereof, and a thin strip of rubber attached to and covering the free surface of said metal shreds.

2. A recapping member for automotive tires comprising a strip of loosely intermeshing shreds of metal, and covering strips of semi-vulcanized rubber attached thereto on opposite sides, said shredded metal strip being cut to form partially separated small portions along opposite edges to facilitate the metal shreds conforming to the road contacting surface of the tire.

References Cited in the file of this patent

UNITED STATES PATENTS

| Number | Name | Date |
|---|---|---|
| 1,083,231 | Wale | Dec. 30, 1913 |
| 1,112,772 | Crane | Oct. 6, 1914 |
| 1,175,624 | Fawkes | Mar. 14, 1916 |
| 1,403,058 | Pushee | Jan. 10, 1922 |
| 1,553,438 | Gauntt | Sept. 15, 1925 |
| 1,649,894 | Field | Nov. 22, 1927 |
| 2,207,100 | Maynard | July 9, 1940 |
| 2,274,855 | Wallace | Mar. 3, 1942 |
| 2,582,701 | Iknayan | Jan. 15, 1952 |

FOREIGN PATENTS

| Number | Country | Date |
|---|---|---|
| 20,820 | Great Britain | of 1910 |
| 536,798 | Germany | Oct. 24, 1931 |